United States Patent
Haskin et al.

(10) Patent No.: US 9,041,691 B1
(45) Date of Patent: May 26, 2015

(54) PROJECTION SURFACE WITH REFLECTIVE ELEMENTS FOR NON-VISIBLE LIGHT

(71) Applicant: Rawles LLC, Wilmington, DE (US)

(72) Inventors: Menashe Haskin, Palo Alto, CA (US); Kavitha Velusamy, San Jose, CA (US); Ning Yao, Cupertino, CA (US); Robert Warren Sjoberg, San Francisco, CA (US); Vijay Kamarshi, Cupertino, CA (US); Kevin Wayne Arthur, San Jose, CA (US)

(73) Assignee: Rawles LLC, Wilmington, DE (US)

( * ) Notice: Subject to any disclaimer, the term of this patent is extended or adjusted under 35 U.S.C. 154(b) by 178 days.

(21) Appl. No.: 13/764,647

(22) Filed: Feb. 11, 2013

(51) Int. Cl.
  *G06F 3/042* (2006.01)
  *G03B 21/56* (2006.01)
  *G03B 21/60* (2014.01)

(52) U.S. Cl.
  CPC ............ *G06F 3/0421* (2013.01); *G06F 3/0425* (2013.01); *G03B 21/60* (2013.01); *G03B 21/56* (2013.01)

(58) Field of Classification Search
  CPC ...... G03B 21/56; G03B 21/60; G03B 21/604; G03B 21/562
  USPC .................. 359/443, 449, 452, 459
  See application file for complete search history.

(56) References Cited

U.S. PATENT DOCUMENTS

| | | | |
|---|---|---|---|
| 6,574,041 B1 * | 6/2003 | Chen | 359/459 |
| 6,796,656 B1 * | 9/2004 | Dadourian | 353/28 |
| 2003/0214710 A1 * | 11/2003 | Takahashi et al. | 359/443 |
| 2006/0017991 A1 * | 1/2006 | Poulsen | 359/20 |
| 2008/0122799 A1 * | 5/2008 | Pryor | 345/173 |
| 2009/0267921 A1 * | 10/2009 | Pryor | 345/177 |
| 2011/0288964 A1 * | 11/2011 | Linder et al. | 705/27.1 |
| 2012/0019646 A1 * | 1/2012 | Thomas et al. | 348/78 |
| 2012/0223885 A1 | 9/2012 | Perez | |
| 2013/0257748 A1 * | 10/2013 | Ambrus et al. | 345/173 |

FOREIGN PATENT DOCUMENTS

WO   WO2011088053 A2   7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Gerald Johnson
*Assistant Examiner* — Christopher Kohlman
(74) *Attorney, Agent, or Firm* — Lee & Hayes, PLLC (57) ABSTRACT

A passive projection screen presents images projected thereon by a projection system. A surface of the screen includes elements that are reflective to non-visible light, such as infrared (IR) light. When non-visible light is directed to the screen, the non-visible light is reflected by the reflective elements back. Part of the reflected light may contact and reflect from a user's fingertip or hand (or other object, such as a stylus) while another part is reflected to the projection system. The projection system differentiates among distances to the surface and distances that include the additional travel to the fingertip. As the fingertip moves closer to the surface, the distances approach equality. When the distances are approximately equal, the finger is detected as touching the surface. In this manner, a projection surface equipped with reflective elements facilitates more accurate touch detection.

22 Claims, 7 Drawing Sheets

PROJECTION SURFACE WITH REFLECTIVE ELEMENTS FOR NON-VISIBLE LIGHT

BACKGROUND

Passive display screens are used to present images that are projected by a projector. Home entertainment systems often use projection systems to project images onto a passive screen to provide a big screen, high quality viewing experience.

Such screens may also be used in augmented reality environments where users interact with real-world objects and virtual or computer-generated objects and information. These environments may be created, for example, in a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth.

Detecting user interaction with projected images onto objects or surfaces, such as a projection screen, can be challenging in augmented reality environments. Depth cameras are often used to ascertain distance from the camera to the projection surface so that the images can be accurately projected. The depth camera also attempts to capture movement of the user's hand (or other portions of the body) when interacting with the projected images. In particular, detection of user touch via a fingertip on a projected image poses difficulties for depth cameras, particularly when the user's fingertips are in close proximity to the reference surface. Because of inherent depth resolution and depth measurement noise of the camera, there exists a noise floor, under which the object's depth image diffuses into the background and digital separation of the two is difficult.

As augmented reality systems continue to evolve, there is a continuing need for improved performance of such systems. In particular, there is a need for improved techniques to accurately detect user interactions, particularly through touch, with projected images.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Projection systems are used in a variety of environments including movie theaters, conference rooms, classrooms, homes, and so forth. These projection systems include a projector configured to emit light towards a projection surface or screen. The projection surface in turn is configured to accept and scatter the light such that an image is presented to viewers. The projection surface may be fixed and static (e.g., a projection screen mounted to a wall or a stand) or portable (e.g., a handheld projection screen). The projection surface may be rigid, bendable, or flexible in shape and contour. For instance, a projection surface may be formed on an article of clothing, such as a glove.

In an augmented reality environment, users may interact with the images projected onto the projection surfaces. In some cases, the user may interact through touch, such as by using his/her pointing finger to select menu options presented by projected images. The projection systems include depth sensors, cameras, or other mechanism that attempt to discern when the user's fingertip touches the projected image. As the fingertip approaches the surface, the depth image diffuses into the background because of inherent depth resolution and depth measurement noise, and digital separation is very difficult. As a result, touch detection accuracy is impaired.

Disclosed herein are projection surfaces with passive elements that are reflective to non-visible light, such as infrared (IR) light. The IR reflective elements may be formed of a material that is opaque to visible light and reflective in non-visible light. In this manner, the elements function as "IR mirrors" that reflect IR light. The elements may be faceted onto a substrate at various locations and angles. Each element is sized approximately several pixels in width. The elements may have any shape, such as circular, oval, or polygonal, and may have flat or non-flat reflection surfaces. Further, the elements may be arranged in a pattern or pseudo-randomly on the substrate. The IR reflective elements may be uniformly distributed, or clustered in regions, or provided in an outer frame region, or other locations.

The projection system includes a depth sensor, such as a time-of-flight (ToF) sensor, RGBz camera, and the like, that emits a non-visible light (e.g., IR light) toward the projection surface. The IR light is reflected by the IR reflective elements, and part of the reflected IR light may contact and reflect from the user's fingertip or hand (or other object, such as a stylus). The reflected IR light, including the IR light that traveled to and from the fingertip, is provided back to the projection system. The projection system differentiates among distances to the surface and distances that include the additional travel to the fingertip. As the fingertip moves closer to the surface, the distances approach equality. When the distances are approximately equal, the finger is detected as touching the surface. In this manner, a projection surface equipped with IR reflective elements facilitates more accurate touch detection.

The projection system and passive screen may be implemented in many ways. One illustrative implementation is described below in which the projection system is implemented as part of an augmented reality environment within a room. However, the system may be implemented in many other contexts and situations in which images are projected onto screens for viewing consumption.

Illustrative Environment

Figure 1:
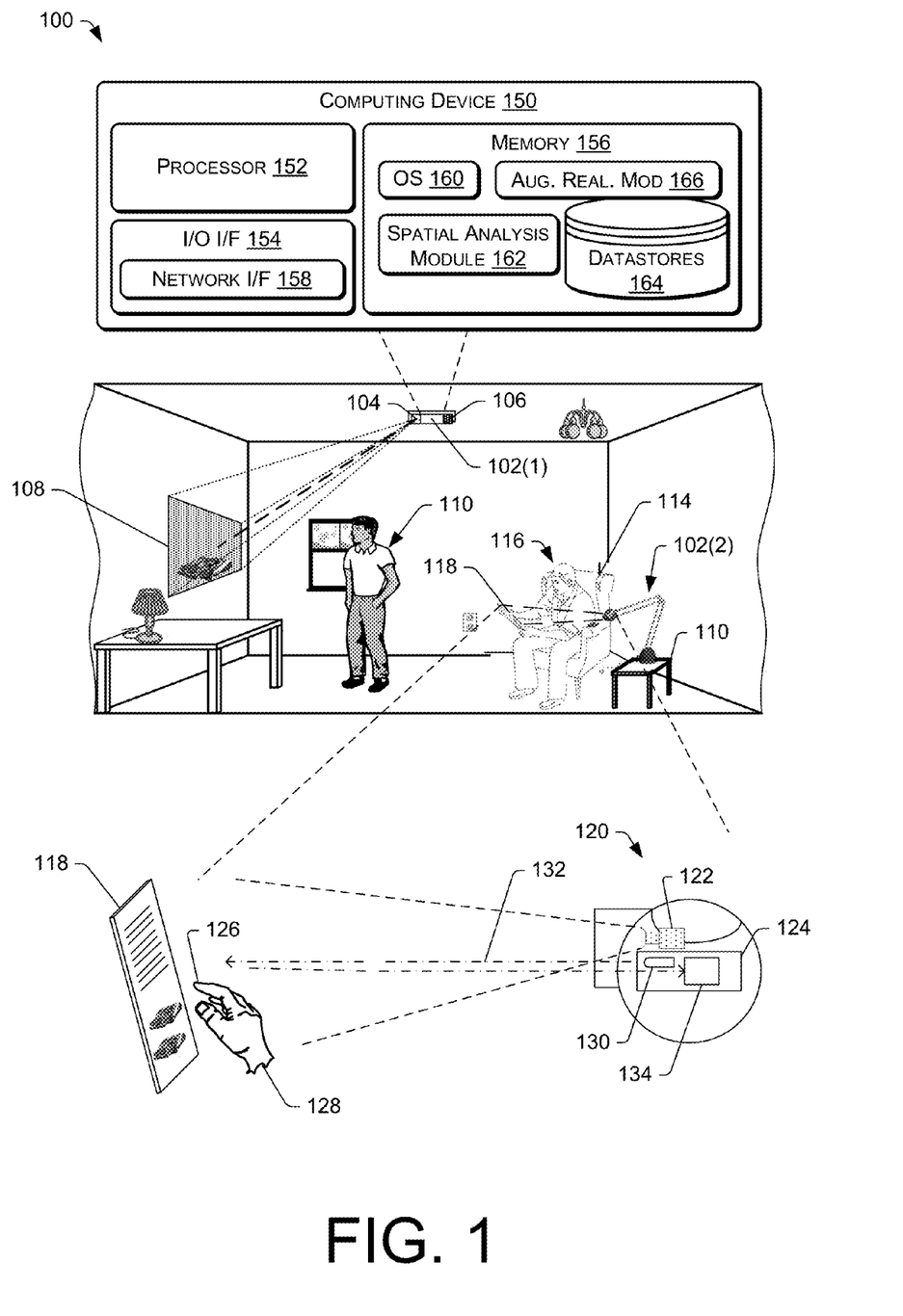
FIG. 1 shows an illustrative scene containing projectors that project images onto passive projection screens or surfaces. Each surface has passive elements that reflect non-visible light, such as infrared (IR) light, to provide more accurate detection of user interaction with the images, such as through touch or gestures.

FIG. 1 shows an illustrative environment 100 in which a projection system and a passive projection screen may be used. In this illustration, the environment 100 may be an augmented reality environment created within a scene, and hosted within an environmental area, such as a room (e.g., room in a home, conference room, etc.). Two augmented reality functional nodes (ARFN) 102(1)-(2) are shown within the room. Each ARFN contains projector(s), camera(s), and computing resources that are used to generate the augmented reality environment 100. In this illustration, the first ARFN 102(1) is a fixed mount system that may be mounted within the room, such as to the ceiling, although other placements are possible. The ARFN 102(1) includes a projector 104 and an associated camera 106 mounted on a common chassis. The projector 104 projects images onto a passive screen 108 mounted or otherwise formed on a wall of the room. A first user 110 may watch and interact with the images being projected onto the screen 108 and the camera 106 of the ceiling-mounted ARFN 102(1) may capture that interaction. In particular, the user may reach out and touch images on the screen 108 and the camera 106 determines when such touch interaction occurs.

A second ARFN 102(2) is embodied to resemble a common table lamp, which is shown sitting on a small table 112 next to a chair 114. A second user 116 is seated in the chair 114 and is holding a portable projection screen 118. The second ARFN 102(2) is equipped with a projector and a camera within the head of the lamp structure. The projector projects images onto the surface of the portable screen 118 and the second user 116 may interact with the images, including through touch interaction with the screen 118. The projected images may be of any number of things, such as books, games (e.g., crosswords, Sudoku, etc.), news, magazines, movies, menus, browser, etc. The portable screen 118 may be essentially any device for use within an augmented reality environment, and may be provided in several form factors. In the implementations described herein, the screen 118 is an entirely passive, non-electronic, device with individual elements reflective to non-visible light, such as IR light.

Since the portable screen 118 may be moved by the user 116, the projector in the lamp-based ARFN 102(2) may be configured to track the portable screen 118 during movement within the room and project an image onto it for presentation. Tracking may be accomplished by recognizing the shape of the screen 118, following optical targets disposed on the screen, and so forth.

In addition to projecting visible images for the viewers 110 and 116, each ARFN 102 may also be used to create an augmented reality environment. In this situation, the projectors may further be used to project structured light patterns onto the surroundings of the room and the associated camera captures the images. The structured light patterns may use invisible light so that the human viewers do not detect the patterns. In still other implementations, each ARFN 102 may employ IR-based illumination systems to illuminate a scene and time-of-flight sensors are used to help image the surrounding environment for creation of the augmented reality environment.

The projectors associated with ARFNs 102(1) and 102(2) may be implemented with any number of technologies capable of generating an image and projecting that image onto a surface. Suitable technologies include a digital micromirror device (DMD), liquid crystal on silicon display (LCOS), liquid crystal display, LCD, laser projector, and so forth. In some implementations, each ARFN may include a plurality of projectors to project images.

As shown beneath the room view in FIG. 1, a head 120 of the lamp-based ARFN 102(2) is enlarged to depict a few of the components arranged therein. In this implementation, the ARFN 102(2) is equipped with a projector 122 and an interaction detection assembly 124 arranged within the lamp head 120. The projector 122 projects images onto a surface of the handheld projection screen 118. In this example, a book or magazine pertaining to auto racing is shown projected onto the screen 118.

The user 116 may interact with the images being projected onto the screen 118 and the interaction detection assembly 124 detects and analyzes the human interaction. The human interaction may be in the form of touch, voice, other sounds (e.g., taps, whistles, etc.), gestures, facial expressions, other movement, and so forth. In FIG. 1, the interaction detection assembly 124 is configured to detect human touch, such as a fingertip 126 of the user's hand 128 contacting the projection surface of screen 118. The touch may be response to selection of projected items, or as part of various gestures—movement, swipe, orientation, and finger arrangement and so on—associated with different operations or navigation instructions.

The interaction detection assembly 124 includes a non-visible light device 130 to emit non-visible light 132. Examples of non-visible light include infrared light, ultraviolet light, and other light of particular wavelengths within the electromagnetic spectrum that is invisible to a human eye.

The projection screen 118 is formed with passive elements that are reflective to the non-visible light. The reflective elements may be formed of a material that is opaque to visible light and reflective in non-visible light. Various implementations of the screen and reflective elements are described below in more detail with reference to FIGS. 2-6. The non-visible light 132 is reflected back to the interaction detection assembly 124 and captured by the ARFN 102(2). A depth sensor 134 is provided to generate data from the reflected non-visible light that is indicative of distances to the screen surface and to portions of the user's hand 128, including the fingertip 126. That is, the depth sensor 134 analyzes the received IR light data to compute distances to the surface and to the hand or fingertip based on IR light reflected from the surface. The depth sensor 134 may be implemented in any number of ways. For instance, in some cases, the depth sensor 134 may utilize a time-of-flight sensor to derive a time-of-flight value as a function of a time lapse between emission of the non-visible light and capture of the non-visible light. Alternatively, the time-of-flight value may be derived as a function of the phase difference between the modulated light output and the returned light. In other cases, the depth sensor 134 may use stereoscopic imaging to map the room or structured light to ascertain depth. In still other cases, the depth sensor 134 may be implemented in whole or in part by an RGBz camera. The depth sensor 134 creates data effective to form a depth map or 3D point cloud that provides distances from the ARFN to objects in the environment.

In some cases, the interaction detection assembly 124 uses the distance data to determine when the user has touched the screen. As mentioned above, due to inherent depth resolution and depth measurement noise of the components, such as depth sensor 134, the depth image diffuses into the background, making it difficult to accurately detect touch. The reflective elements on screen surface aid in improving accuracy of the touch detection.

Figure 2A:
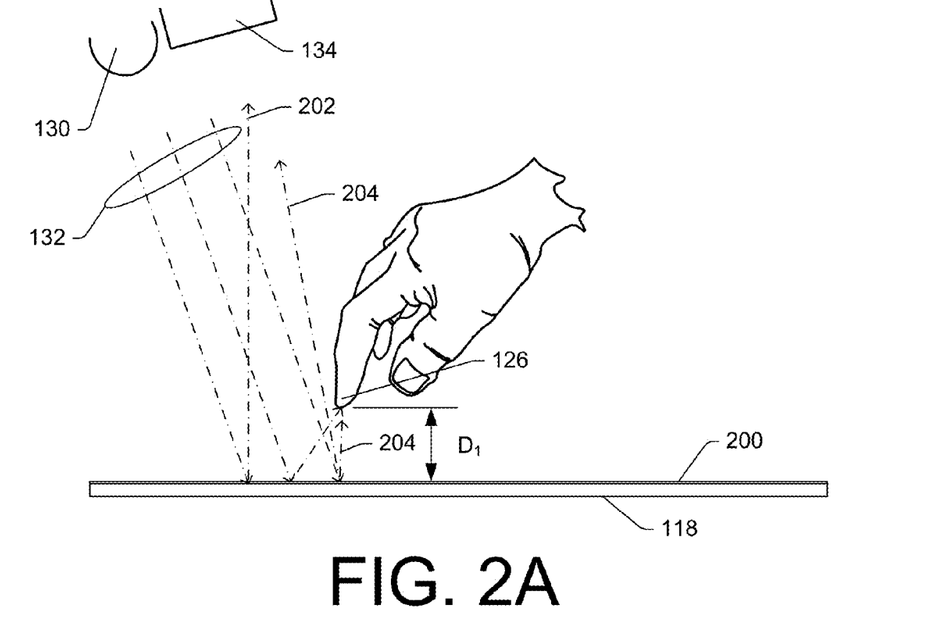
FIGS. 2A and 2B illustrate the projection surface with passive reflective elements to demonstrate how the elements aid in detection of human touch.
Figure 2B:
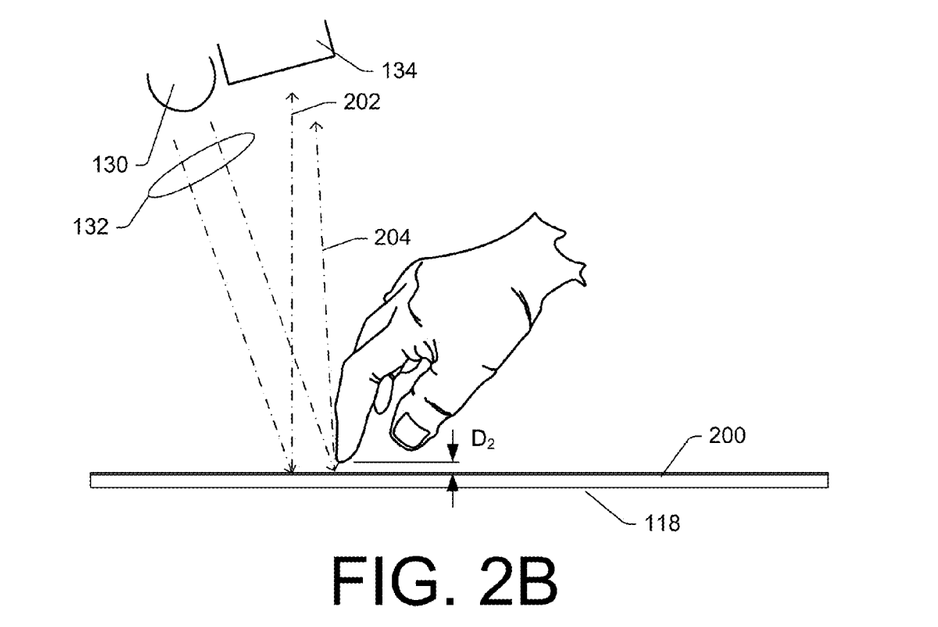

FIGS. 2A and 2B show a projection surface 200 on the screen 118 to illustrate how the reflective elements aid in detection of human touch. In FIG. 2A, the human's fingertip 126 is a distance $D_1$ from the surface 200. As the non-visible light device 130 emits non-visible light 132 toward the surface 200, some of the non-visible light, referenced as the non-object reflected light 202, is reflected from the screen surface 200 back to the depth sensor 134. Other of the non-visible light 132, referenced as the object reflected light 204, is reflected from the screen surface 200 to the fingertip 126. The object reflected light 204 is then reflected back from the fingertip 126, reflected by the elements on the surface 200, and back toward the depth sensor 134. As a result, the object reflected light 204 travels an extra distance that is roughly twice the distance $D_1$ between the fingertip 126 and the surface 200.

In FIG. 2B, the human's fingertip 126 is moved closer to the surface 200 to a distance $D_2$, which is nearly touching the surface. In this case, the non-object reflected light 202 yields the same distance data, but the object reflected light 204 yields a smaller distance because the extra surface-to-fingertip distance $D_2$ is substantially less than the first distance $D_1$. As these distances approach zero, the distance registered by the depth sensor 134 for the non-object reflected light 202 and the object reflected light 204 becomes approximately equal. When the two distances cross a threshold distance (e.g., 1 cm), the interaction detection assembly 124 interprets the human interaction as a touch.

With reference again to FIG. 1, the interaction detection assembly 124 may alternatively or additionally use the distance data to detect and interpret user gestures. That is, the interaction detection assembly 124 may use the depth data to recognize patterns indicative of pre-determined gestures made by the viewer's hand 128. One or more candidate gestures are identified based on the captured non-visible light data, and the candidate gestures are evaluated with respect to the context of the content being projected onto the projection screen 102. Once a statistically likely gesture is identified, the operation or navigation instruction associated with the gesture is executed.

For example, suppose the second user 116 is reading an automobile magazine projected onto the screen 118. The second user 116 may wish to rotate a virtual car object projected onto the screen 118 by making a grasping gesture to pick up the car and then rotate it. The interaction detection assembly 124 may recognize this grasping action as anyone of multiple candidate gestures associated with an instruction to rotate the virtual car object. For discussion purposes, suppose the interaction detection assembly 124 assigns the highest statistical probability to the depth data as being a grasping gesture, and begins to execute image control functionality for rotating the car object. As a result, the projector 122 begins projecting subsequent images that show the car object rotating.

Figure 3A:
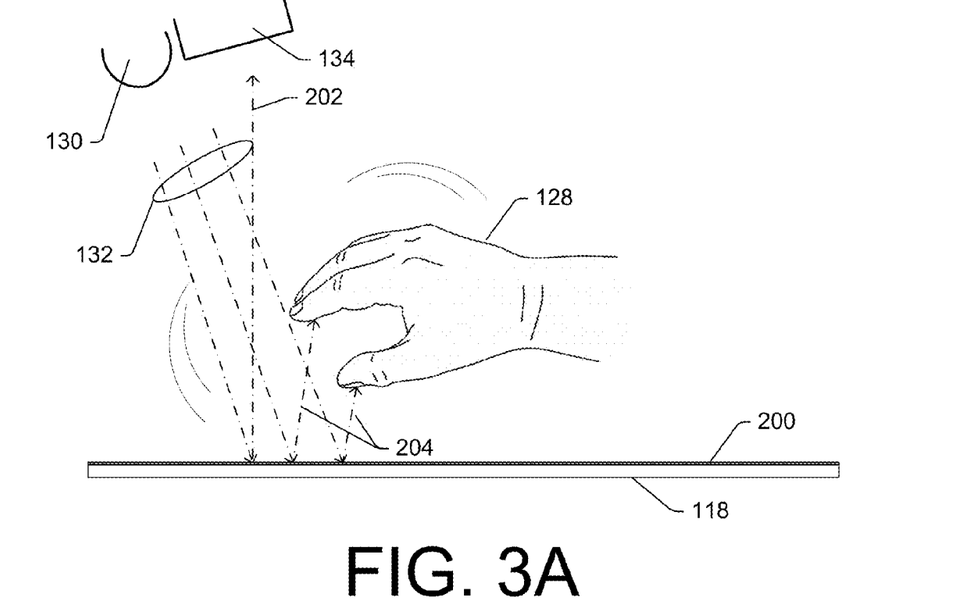
FIGS. 3A and 3B illustrate the projection surface with passive reflective elements to demonstrate how the elements aid in detection of human gestures.
Figure 3B:
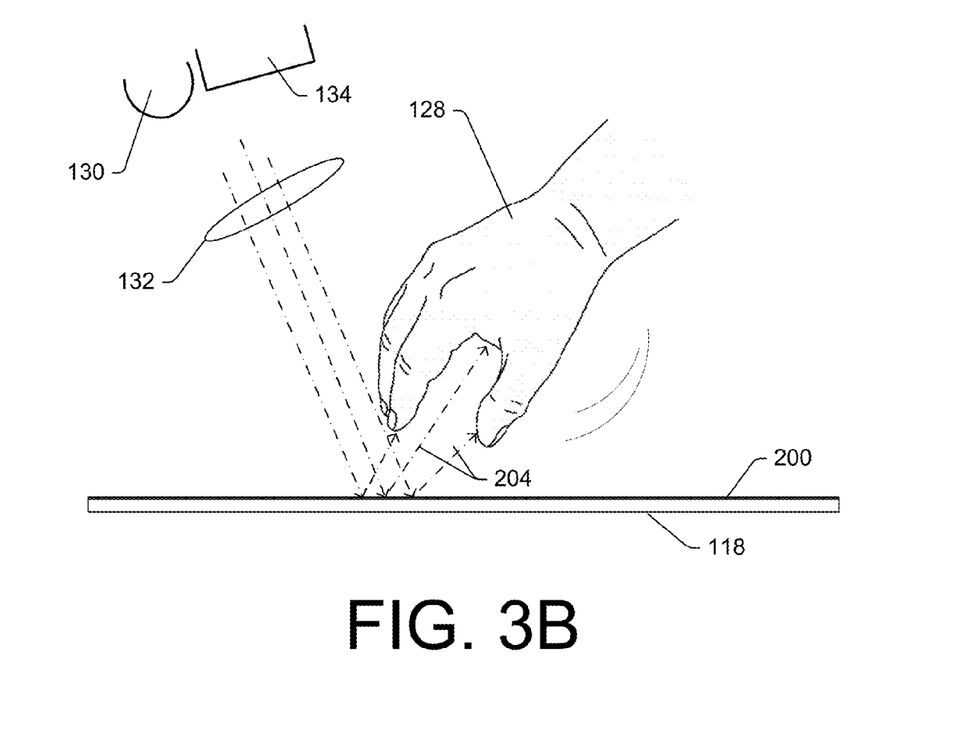

FIGS. 3A and 3B show a projection surface 200 on the screen 118 to illustrate how the reflective elements aid in gesture recognition. In FIG. 3A, the human's hand is slightly open and the palm is facing downward and relatively parallel with the surface 200. As the non-visible light device 130 emits non-visible light 132 toward the surface 200, some of the non-visible light, referenced as the non-object reflected light 202, is reflected from the screen surface 200 back to the depth sensor 134. Other of the non-visible light 132 is reflected from the screen surface 200 onto the hand 128. This light, referenced generally as object reflected light 204, may engage various portions of the hand depending upon the shape, orientation, and position of the hand. As shown in FIG. 3A, the non-visible object reflected light 204 may be reflected onto the fingers, thumb, open palm, forearm, and so forth. This light is reflected back to the surface 200, where the reflective elements thereon reflect the non-visible light toward the depth sensor 134. From this reflected light, the depth sensor 134 can create depth maps of the scene that capture the position and movement of the human hand 128.

In FIG. 3B, the human hand is rotated so that the fingers are tilted toward the screen 118 as the user begins a grasping motion. As the user rotates the hand, the object reflected light 204 engages the surface of the hand to capture the changing position. As the depth sensor 134 receives the reflected non-visible light, the sensor 134 continues to generate a changing depth map that essentially tracks the hand movement, orientation, shape, and so forth. From this depth map, one or more candidate gestures may be identified and tested to ascertain whether the user is making a gesture to control some activity.

With reference again to FIG. 1, associated with each ARFN 102(1)-(2), or with a collection of ARFNs, is a computing device 150, which may be located within the augmented reality environment 100 or disposed at another location external to it. Each ARFN 102 may be connected to the computing device 150 via a wired network, a wireless network, or a combination of the two. The computing device 150 has a processor 152, an input/output interface 154, and a memory 156. The processor 152 may include one or more processors configured to execute instructions. The instructions may be stored in memory 156, or in other memory accessible to the processor 152, such as storage in cloud-based resources.

The input/output interface 154 may be configured to couple the computing device 150 to other components, such as projectors, cameras, microphones, other ARFNs, other computing devices, and so forth. The input/output interface 154 may further include a network interface 158 that facilitates connection to a remote computing system, such as cloud computing resources. The network interface 158 enables access to one or more network types, including wired and wireless networks. More generally, the coupling between the computing device 150 and any components may be via wired technologies (e.g., wires, fiber optic cable, etc.), wireless technologies (e.g., RF, cellular, satellite, Bluetooth, etc.), or other connection technologies.

The memory 156 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 156 and configured to execute on a processor, such as the processor 152. An operating system module 160 is configured to manage hardware and services within and coupled to the computing device 150 for the benefit of other modules.

A spatial analysis module 162 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. The spatial analysis module 162 provides the information used within the augmented reality environment to provide an interface between the physicality of the scene and virtual objects and information.

One or more datastores 164 may be provided within the memory 156 or separate therefrom. Example datastores include a system parameters datastore configured to maintain information about the state of the computing device 150, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

Another example datastore 164 is an object parameters datastore configured to maintain information about the state of objects within the scene. The object parameters may include the surface contour of the object, overall reflectivity, color, and so forth. This information may be acquired from the ARFN, other input devices, or via manual input and stored within the object parameters datastore.

Still another example datastore 164 is an object datastore 168 configured to maintain a library of pre-loaded reference objects. This information may include assumptions about the object, dimensions, and so forth. For example, the object datastore may include a reference object of a beverage can and include the assumptions that beverage cans are either held by a user or sit on a surface, and are not present on walls or ceilings. The spatial analysis module 162 may use this data maintained in the datastore to test dimensional assumptions when determining the dimensions of objects within the scene. In some implementations, the object parameters in the object parameters datastore may be incorporated into the object datastore. For example, objects in the scene which are temporally persistent, such as walls, a particular table, particular users, and so forth may be stored within the object datastore. The object datastore may be stored on one or more of the memory of the ARFN, storage devices accessible on the local network, or cloud storage accessible via a wide area network.

An augmented reality module 166 is configured to generate augmented reality output in concert with the physical environment. The augmented reality module 166 may employ essentially any surface, object, or device within the environment 100 to interact with the users. The augmented reality module 166 may be used to track items within the environment that were previously identified by the spatial analysis module 162. The augmented reality module 166 includes a tracking and control module configured to track one or more items within the scene and accept inputs from or relating to the items.

The ARFNs 102 and computing components of device 150 that have been described thus far may be operated to create an augmented reality environment in which images are projected onto various surfaces and items in the room, and the users 106 and 116 may interact with the images. The users' movements, voice commands, and other interactions are captured by the ARFNs 102 to facilitate user input to the environment.

The ARFN 104 may be further equipped with other components to detect human interaction. For example, the ARFN 104 may include one or more microphones to detect verbal input or other sounds, one or more speakers to output sound, and speech recognition technologies. These audio components enable voice interaction. As another example, the ARFN 104 may be equipped with a camera (or additional camera) to capture other forms of user interaction, such as head movement, facial expression, environmental conditions, and so forth.

Example Screen Implementations

The passive projection screens, such as the wall-mounted screen 106 and the portable screen 118, are formed with elements that are reflective to non-visible light, such as infrared (IR) light. The reflective elements may be formed of a material that is opaque to visible light and reflective in non-visible light. In this manner, the elements function as "IR mirrors" that reflect IR light, while the screen as a whole continues to otherwise scatter visible light for viewing of projected images.

Figure 4:
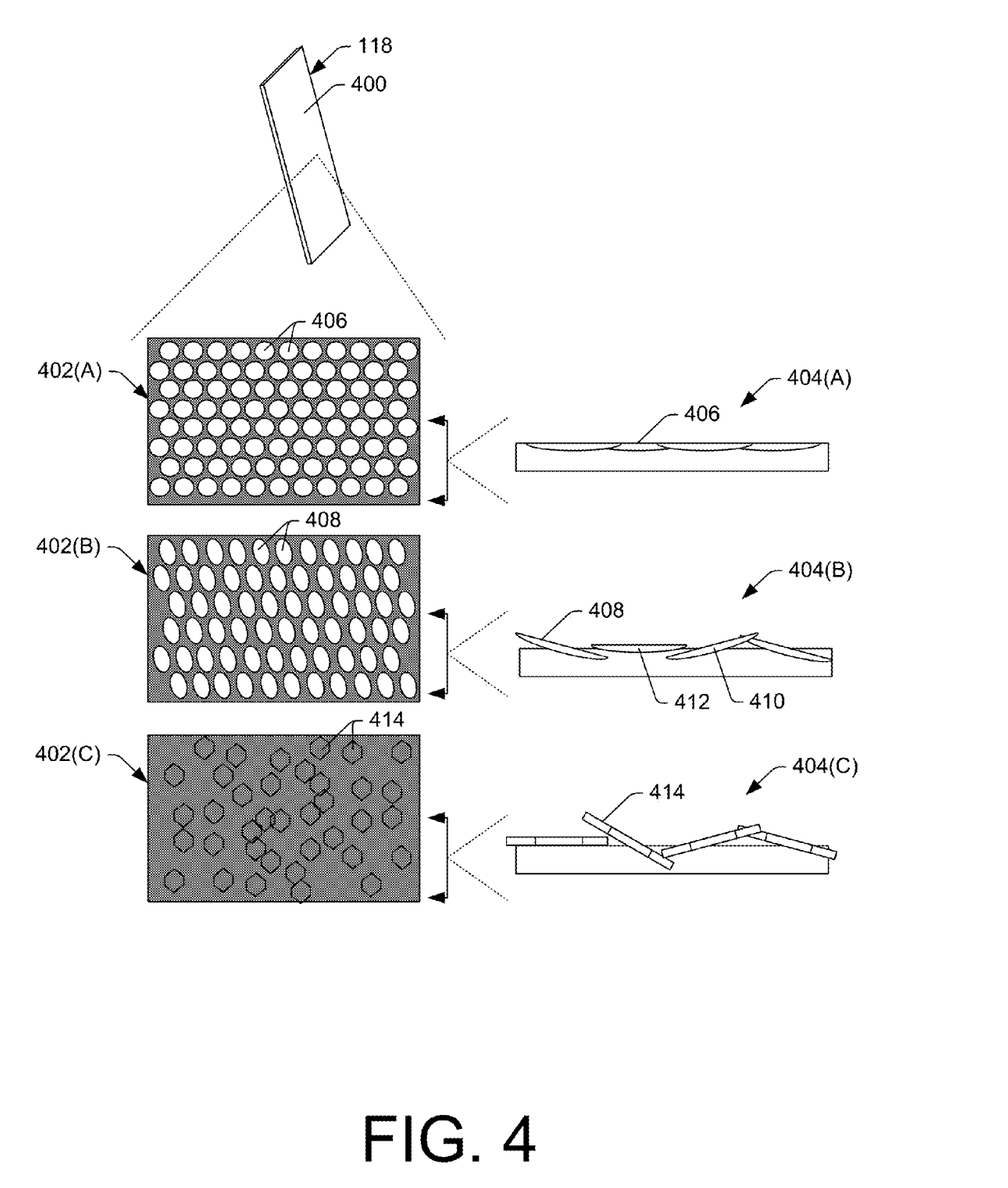
FIG. 4 illustrates various example implementations of a passive projection surface with different types and patterns of IR reflective elements.
Figure 5:
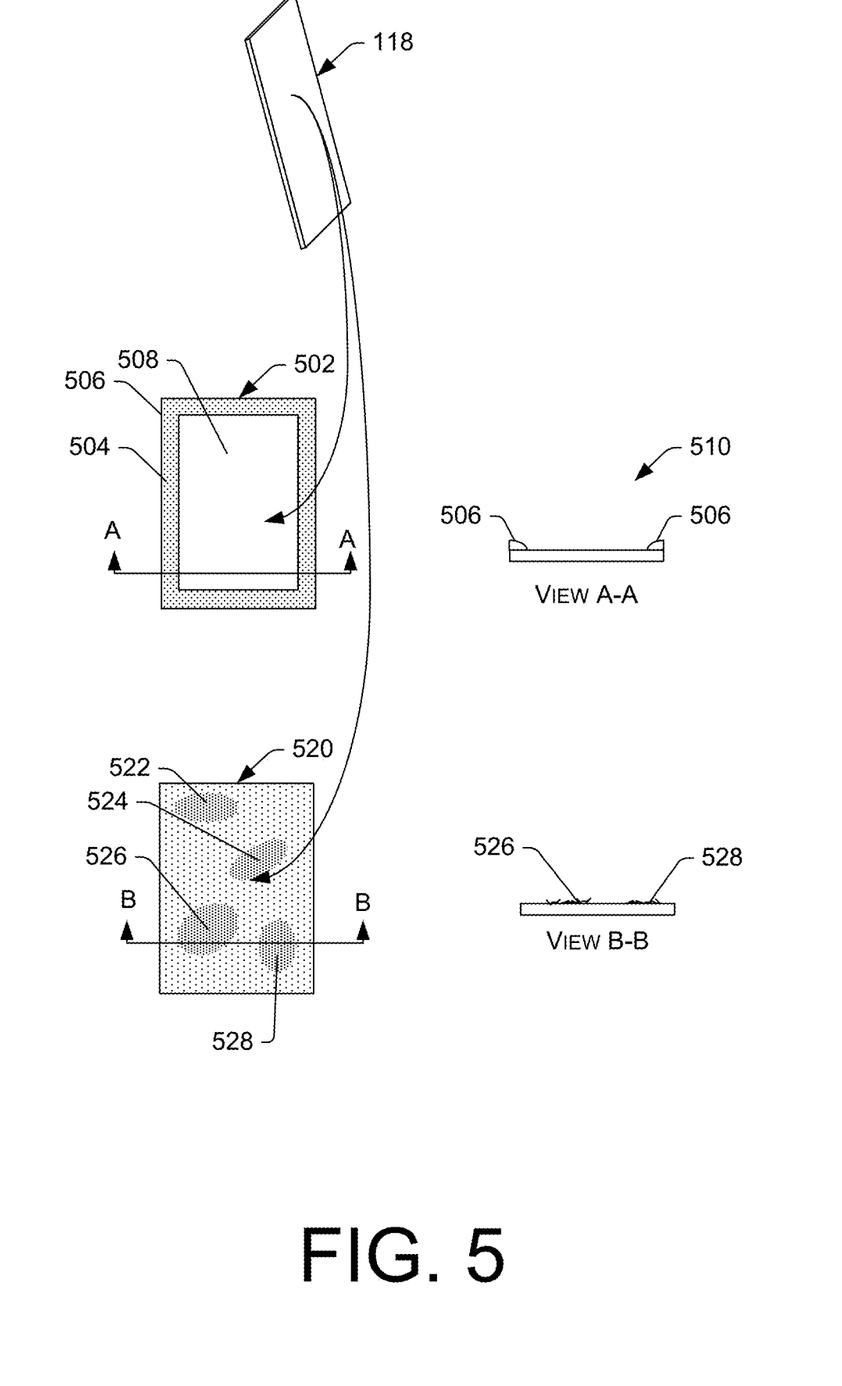
FIG. 5 illustrates other example implementations of the passive projection surface with concentrations of reflective elements at various regions of the surface.

FIGS. 4-5 show various examples of passive projection screens with reflective elements on a projection surface. The screens are representative of the stationary screen 108 and portable screen 118 of FIG. 1. The reflective elements may be faceted or otherwise formed on a substrate at various locations and angles and according to various distribution patterns and densities. Each element may have essentially any shape, such as circular, oval, or polygonal, and may have a flat or non-flat reflection surface. Further, the elements may be arranged in a pattern or pseudo-randomly on the substrate. The reflective elements may be uniformly distributed or clustered in regions, or provided in an outer frame region, or other locations. The following screens in FIGS. 4 and 5 are merely representative, and not intended to be limiting in any manner.

FIG. 4 illustrates several surface implementations of a projection screen, such as the portable projection screen 118. In this example implementation, the screen 118 is rectangular in shape, having a length and width akin to a tablet or piece of paper. The longest dimension may be, for example, approximately 60 centimeters or less. The screen may also have a narrow width, such as less than 1 centimeter. The weight of the portable projection screen 118 may be less than three kilograms in some implementations. In other implementations, the screen may have other shapes and dimensions.

The screen 118 may comprise a structural substrate such as a foam core, plastic sheet, metal-based sheet, and so forth. The structural substrate may be configured to be rigid, flexible, bendable, foldable, rollable, and so forth. A projection surface 400 suitable for scattering visible light may be overlaid on the substrate, or otherwise attached to the substrate. In some implementations, the substrate itself may form the projection surface. In yet another implementation, the screen may be formed of a fabric and hence could be conformable to essentially any shape, such as in the form of a glove fitted on a human hand to act as a projection surface.

In the illustrated implementation, the screen 118 has a projection surface 400 with multiple reflective elements that are reflective to non-visible light, such as IR light. Each element is sized with diameters or width dimensions of approximately several pixels. These reflective elements may be embossed onto a projection surface (e.g., either the projection layer or substrate), adhered to the surface, deposited onto the surface, or otherwise provided to form the projection surface. As one particular implementation, for instance, the reflective elements may be embossed in a material of acrylic, polycarbonate, or cyclic olefin copolymer (COC).

In FIG. 4, an enlarged view of the screen 118 is depicted to illustrate different example configurations of the reflective elements. Here, three enlarged portions 402(A), 402(B), and 402(C) of the screen 118 are shown, along with a corresponding side profile 404(A), 404(B), and 404(C). The first enlarged portion 402(A) has a uniform array of circular reflective elements 406. As shown in the side profile 404(A), the collection of reflective elements 406 forms a relatively flat or planar surface. Each element 406, however, may have a flat surface, paraboloidal surface, or other contour effective to reflect IR light. While this implementation shows the circular reflective elements 406 in a uniform pattern, other distributions may be used, as will be described below in more detail. Further, other shapes may be used for the reflective elements.

The second enlarged portion 402(B) has a uniform array of oval-shaped reflective elements 408. As shown in the side profile 404(B), the oval-shaped reflective elements 408 are deposited or otherwise formed so that the surface is not relatively flat or planar. More particularly, certain reflective elements 408 may be angled relative to others. As one example, a first element 410 is angled relative to second element 412. In this manner, the non-visible light may be reflected in various different directions to effectively ensure broader reflective coverage and a reflection from the user's hand and/or finger. As above, each element 406 may have a flat surface, paraboloidal surface, or other contour effective to reflect IR light.

The third enlarged portion 402(C) has multiple polygonal-shaped reflective elements 414, such as the illustrated hexagonal shape. The polygonal-shaped elements 414 are randomly distributed on the surface, rather than arranged in a uniform pattern as shown in portions 402(A) and 402(B). However, similar to the oval-shaped reflective elements 408 in the side profile 404(B), the polygonal-shaped reflective elements 414 are deposited or otherwise formed so that elements are angled relative to one another as shown. In this implementation, each element 414 has a substantially flat surface, although other contours may be used.

FIG. 5 illustrates more representative implementations of a projection screen, such as the portable projection screen 118. More particularly, the implementations in FIG. 5 illustrate different approaches to arranging the reflective elements onto the surface of the screen 118. Two front views of the screen 118 are shown to illustrate two example arrangements of reflective elements. A first example surface 502 of the screen 118 has reflective elements 504 arranged in an enclosing border region 506 about a primary viewing region 508. In this manner, the element arrangement on the surface 502 resembles a picture frame. Further, the border region 506 may even be raised relative to the primary viewing region 508, as shown by the side profile 510 taken as a cross-section through line C-C. With this arrangement, non-visible light is reflected by the reflective elements in the border region 506. More particularly, if the raised border is curved as illustrated, the reflective elements may reflect light across the surface of the screen for enhanced touch detection, as will be described in more detail below with reference to FIGS. 6A and 6B.

In FIG. 5, a second example surface 520 of the screen 118 has reflective elements 504 arranged in various clusters or concentrations across the surface in a non-uniform distribution. As shown, four element clusters 522, 524, 526, and 528 are deposited or otherwise formed on the surface. The remaining parts of the surface may have less reflective elements or no reflective elements. While four clusters 522-528 are shown, more or less than four clusters may be used. Further, the clusters may be randomly distributed across the surface, or arranged in predefined locations that assume a particular anticipated set up of the projection system and the user's expected touch activity with the screen surface. For instance, if the user is right handed and the projector is arranged relative to the screen to project from the left, mirror clusters may be formed more along the left hand side of the screen to enable reflection toward the incoming right hand during a touch action. As shown by the cross-section view taken along line B-B, the clusters 526 and 528 have a higher density of deposition of reflective elements.

Figure 6A:
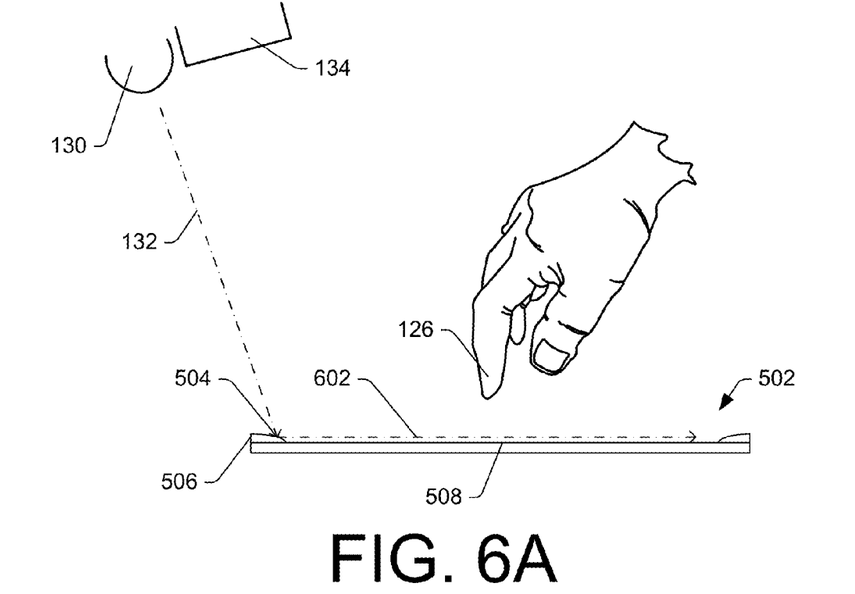
FIGS. 6A and 6B illustrate one implementation of the projection surface as shown in FIG. 5 to demonstrate how concentrations of reflective elements along a border aid in detection of human touch.
Figure 6B:
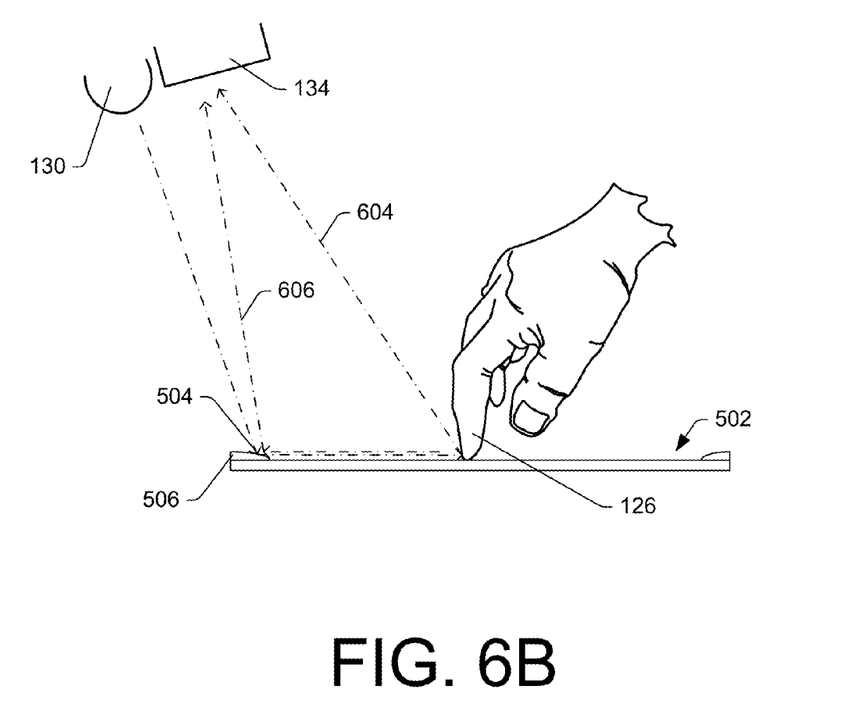

FIGS. 6A and 6B show the projection surface 502 of FIG. 5 to demonstrate how concentrations of reflective elements along a border aid in detection of human touch. In FIG. 6A, the non-visible light device 130 emits non-visible light 132 toward the surface 502, where some of the non-visible light 132 is reflected by the reflective elements 504 on the raised and rounded border region 506. The reflected light 602 traverses the viewing region 508 of the surface 502 substantially in parallel with the surface 502. The reflected light beams may effectively form a grid or plane across the viewing region 508 of the surface, so that when the user makes contact with the grid or plane, a touch may be detected.

More specifically, when the human's fingertip 126 is above the reflected light 602 and the surface 502 as shown in FIG. 6A, there is no reflected portion returning to the depth sensor 134. Rather, the reflected light 602 may continue indefinitely into space or reflected by the other border in a direction that is not captured by the depth sensor 134.

However, as the human's fingertip 126 makes contact with the surface 502 as shown in FIG. 6B, the fingertip 126 interrupts the reflected light 602. As a result, part of the non-visible light may be reflected back toward the depth sensor 134, as represented by non-visible light path 604, and part of the non-visible light may be reflected back toward the depth sensor 134 through additional reflection by the reflective elements 504 in the border region 506, as represented by non-visible light path 606. When the depth sensor 134 receives the non-visible light back, it can calculate a finite distance for the non-visible light, in contrast to the situation in FIG. 6A where no finite distance may be found for the reflected light 602. In this way, when a finite distance can be calculated, the system determines that the user has made contact with the surface 502.

It is noted that in some implementations, a screen may have multiple viewing surfaces of different types. For instance, the screen 118 may have a first surface that is configured as surface 502 in FIG. 5 and an opposing second surface that is configured as surface 520 in FIG. 5. In another implementation, the screen 118 may have first and second surfaces with clusters of reflective elements, such as surface 520, but where the clusters are arranged differently to provide custom detection for left-handed users and right-handed users. In still another implementation, the screen 118 may have a first surface that functions purely has a display surface without any reflective elements for reflection of non-visible light, and a second surface that includes the reflective elements to enhance detection of touch interaction. In yet other implementations, the screen may be implemented with more than two surfaces where various surfaces have different patterns, shapes, and densities of reflective elements.

Illustrative Process

Figure 7:
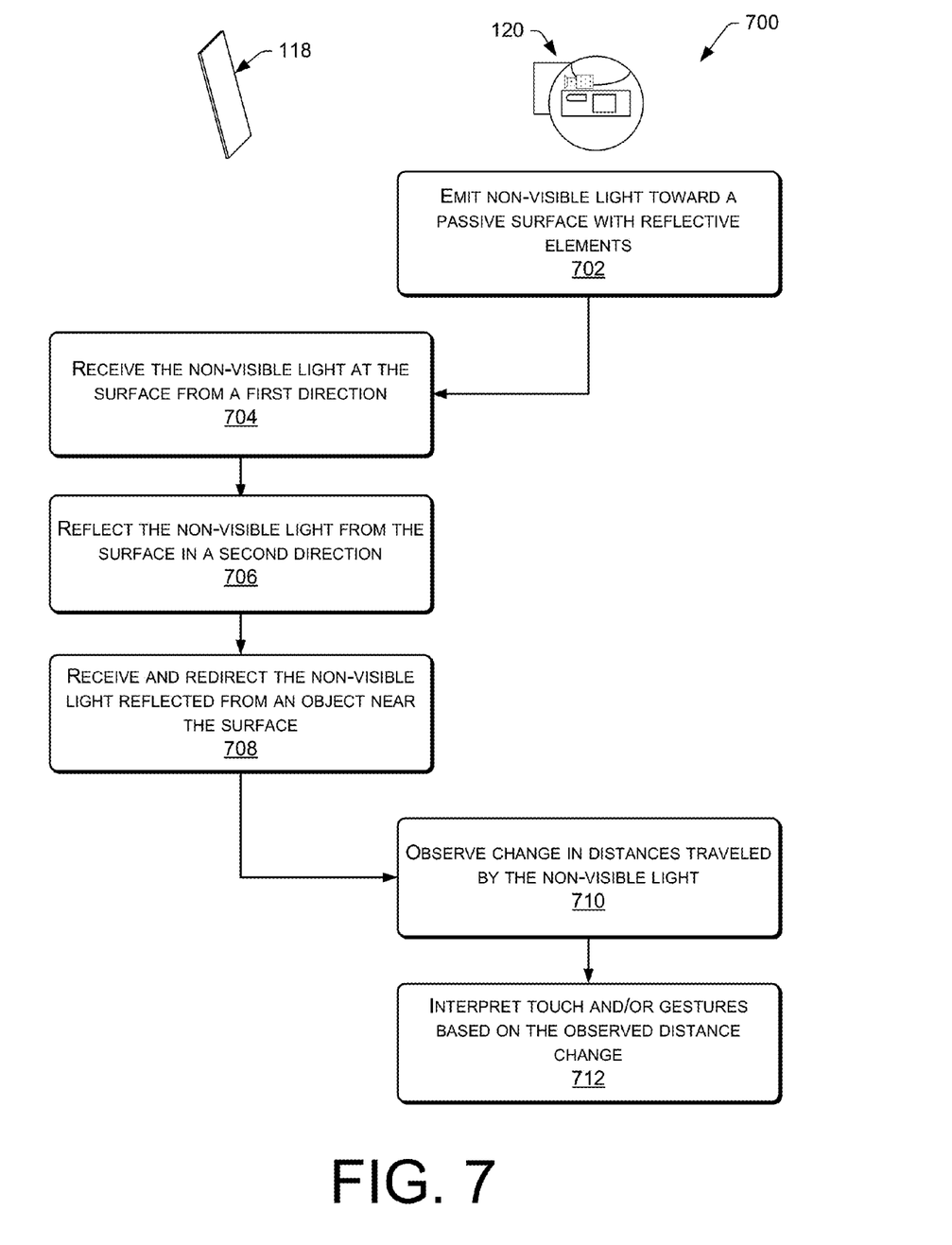
FIG. 7 is a flow diagram of an example process for detecting user interaction, and particularly touch interaction, with images projected onto a projection surface.

FIG. 7 shows an illustrative process 700 for detecting user interaction, and particularly touch interaction, with images projected onto a projection surface. The processes described herein may be implemented by the various passive screens shown in FIGS. 2-6. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. Further, not all of the blocks may be executed in each implementation.

At 702, non-visible light, such as infrared light, is emitted toward a surface of the passive screen. The surface includes reflective elements to reflect the non-visible light. Examples of the passive screen with reflective elements are shown and described with reference to FIGS. 2-6. The non-visible light may be emitted, for example, by a non-visible light device 130 mounted in the head component 120 of FIG. 1. Concurrently, visible light rays may be projected onto the passive screen by a projector. The visible light rays carry images projected onto the screen. The surface is configured to scatter the visible light, thereby displaying the projected images.

At 704, the non-visible light is received at the surface of the screen from a first direction (i.e., from the direction of emission from the non-visible light device). In most cases, the non-visible light will be received at an angle to the surface, although in limited cases, the non-visible light may be received orthogonal to the surface.

At 706, the non-visible light is reflected from the surface in a second direction different that the first direction. For instance, as shown in FIGS. 2A and 2B, the non-visible light may be reflected back at a complementary angle to the surface. In the case of a non-planar application of the reflective elements, such as the surfaces in 404(B) and 404(C) in FIG. 4, the non-visible light may be reflected a various angles. In another situation, the non-visible light may be reflected along the surface, as shown by the implementation in FIG. 6A.

As the non-visible light travels in the second direction, it may contact an object, such as the user's hand or finger, which is near the surface of the screen. The non-visible light is then reflected from that object.

At 708, the non-visible light that is reflected from the object is once again received and reflected by the surface back toward the head component 120.

At 710, a change in distances traveled by the non-visible light is observed. In one implementation, the depth sensor 134 calculates the various distances traveled by the non-visible light and the computer observes differences in these distances. The first distances of the non-visible light that is reflected directly from the screen are generally shorter than the second distances of the non-visible light that includes the round-trip travel distance between the surface and the object. As the object is moved closer to the surface, these longer distances become shorter until substantially similar to the directly reflected distances.

At 712, a user touch and/or gesture is interpreted based on the observed changes in distances. For instance, as the distances become substantially similar, the computer may interpret that as a touch event, as shown in FIG. 2B.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
 a projector to project images using visible light;
 an infrared (IR) light device to emit IR light;
 a passive display screen to present the images projected thereon by the projector, the passive display screen comprising:
  a surface to scatter the visible light received from the projector and thereby present the images; and
  a plurality of reflective elements on the surface, the plurality of reflective elements being configured to reflect the IR light;
 a depth sensor to capture the IR light reflected by at least some of the reflective elements of the passive display screen, the depth sensor generating data used to compute distances to the surface; and
 wherein at least a portion of the IR light emitted by the IR light device is reflected by at least some of the reflective elements of the passive display screen onto a hand when the hand is proximal to the passive display screen and the distances derived from the data generated by the depth sensor is used to determine if the hand touches the surface.

2. The system of claim 1, wherein the plurality of reflective elements of the passive display screen are clustered in one or more areas on the surface.

3. The system of claim 1, wherein the plurality of reflective elements of the passive display screen are arranged in a pattern on the surface.

4. The system of claim 1, wherein the depth sensor comprises a time-of-flight sensor.

5. The system of claim 1, wherein a first distance is derived from the data associated with IR light reflected by at least a first portion of the reflective elements of the passive display screen back to the depth sensor and a second distance is derived from the data associated with the IR light reflected by at least a second portion of the reflective elements onto the hand.

6. The system of claim 5, wherein a touch is determined to occur when the first and second distances are substantially equal.

7. The system of claim 1, wherein the data generated by the depth sensor is used to detect a gesture made by the hand relative to the surface.

8. A device comprising:
 a passive display screen to present images projected thereon from a projector, the passive display screen comprising:
  a substrate;
  a surface of the substrate to scatter visible light received from the projector to present the images; and
  a plurality of reflective elements on the surface, the plurality of reflective elements being configured to reflect non-visible light such that when an object is moved proximal to the passive display screen, the non-visible light is reflected by at least a portion of the reflective elements onto the object for use in detection of proximity of the object to the surface.

9. The device of claim 8, wherein the non-visible light comprises infrared light.

10. The device of claim 8, wherein the plurality of reflective elements are clustered in one or more areas on the surface.

11. The device of claim 8, wherein the plurality of reflective elements are arranged in a pattern on the surface.

12. The device of claim 8, wherein the passive display screen further comprises a raised portion that forms a border around the surface, and the reflective elements being on the raised portion.

13. The device of claim 8, wherein each of the reflective elements comprises at least one of an annular perimeter or a polygonal perimeter.

14. The device of claim 8, wherein each of the reflective elements comprises at least one of a flat reflection surface or a paraboloidal reflection surface.

15. The device of claim 8, wherein individual reflective elements within the plurality of reflective elements are angled relative to one another.

16. The device of claim 8, wherein the object comprises a human finger.

17. A method comprising:
   emitting non-visible light toward a projection screen, the projection screen having a plurality of reflective elements that reflect the non-visible light;
   capturing a first portion of the non-visible light reflected by the reflective elements on the projection screen;
   deriving a first distance from the first portion of the reflected non-visible light, the first distance being indicative of a distance to the projection screen;
   capturing a second portion of the non-visible light that is reflected by the reflective elements onto an object;
   deriving a second distance from the second portion of the reflected non-visible light, the second distance being indicative of a combined distance to the projection screen and from the projection screen to the object; and
   determining when the object contacts the projection screen based at least in part on the first and second distances.

18. The method of claim 17, wherein determining when the object contacts the projection screen comprises declaring a contact when a difference between the first and second distances are within a predefined range.

19. The method of claim 17, wherein determining when the object contacts the projection screen comprises declaring a contact when the first and second distances are approximately equal.

20. The method of claim 17, wherein the object comprises a human finger.

21. The method of claim 17, wherein the object comprises a stylus.

22. The method of claim 17, further comprising detecting a gesture made by a human relative to the projection screen based at least in part on the first and second distances.

* * * * *